US009849711B2

(12) United States Patent
Schaede et al.

(10) Patent No.: US 9,849,711 B2
(45) Date of Patent: Dec. 26, 2017

(54) PRINTING MACHINE WITH LASER PERFORATING

(75) Inventors: Johannes Georg Schaede, Würzburg (DE); Johann Emil Eitel, Thüngen (DE)

(73) Assignee: KBA-GIORI S.A., Lausanne (CH)

( * ) Notice: Subject to any disclaimer, the term of this patent is extended or adjusted under 35 U.S.C. 154(b) by 2164 days.

(21) Appl. No.: 11/578,224

(22) PCT Filed: Apr. 14, 2005

(86) PCT No.: PCT/IB2005/001058

§ 371 (c)(1),
(2), (4) Date: Nov. 17, 2006

(87) PCT Pub. No.: WO2005/102728

PCT Pub. Date: Nov. 3, 2005

(65) Prior Publication Data

US 2007/0222206 A1 Sep. 27, 2007

(30) Foreign Application Priority Data

Apr. 22, 2004 (EP) .................................... 04009514

(51) Int. Cl.
*B23K 26/38* (2014.01)
*B42D 15/00* (2006.01)
*B42D 25/346* (2014.01)

(52) U.S. Cl.
CPC ............ *B42D 15/00* (2013.01); *B42D 25/346* (2014.10)

(58) Field of Classification Search
USPC ... 219/121.7, 121.71, 121.6, 121.85, 121.82; 346/76 L; 235/375, 385
See application file for complete search history.

(56) References Cited

U.S. PATENT DOCUMENTS 4,027,137 A * 5/1977 Liedtke ...................... 219/121.7
4,149,062 A * 4/1979 Limmer et al. .......... 219/121.68
4,413,562 A * 11/1983 Fischer ......................... 101/408
4,552,448 A * 11/1985 Davidson ...................... 399/304
5,062,359 A 11/1991 Giori
5,087,805 A * 2/1992 Silverschotz et al. ... 219/121.71
(Continued)

FOREIGN PATENT DOCUMENTS

AU 199648052 B2 10/1996
DE 2614941 A1 1/1977
(Continued)

*Primary Examiner* — Thien S Tran

(74) *Attorney, Agent, or Firm* — Seager, Tufte & Wickhem LLP

(57) ABSTRACT

There is described a printing machine for printing sheets, in particular sheets for the production of securities, banknotes, passports, ID cards and other valuable documents, comprising at least a sheet feeder, a printing unit, a delivery unit with delivery piles for the printed sheets and a sheet transport system for transporting the printed sheets along a transporting path from the printing unit to the delivery piles. The printing machine further comprises a laser perforating unit with at least one laser head disposed along the transporting path of the sheet transport system for perforating the printed sheets, and a first aspiration unit to maintain the printed sheets against an aspiration surface during perforation by said laser perforating unit.

18 Claims, 8 Drawing Sheets

(56) References Cited

U.S. PATENT DOCUMENTS

| | | | | |
|---|---|---|---|---|
| 5,298,717 | A * | 3/1994 | DeRossett, Jr. | 219/121.68 |
| 5,504,301 | A * | 4/1996 | Eveland | 219/121.67 |
| 5,557,311 | A | 9/1996 | Perrington et al. | |
| 5,592,573 | A | 1/1997 | Eisenbarth et al. | |
| 5,598,006 | A | 1/1997 | Stringa | |
| 5,640,908 | A * | 6/1997 | Schaede | 101/484 |
| 5,797,320 | A * | 8/1998 | Buschulte et al. | 101/226 |
| 5,975,583 | A * | 11/1999 | Cobben et al. | 283/93 |
| 6,027,270 | A | 2/2000 | Greive | |
| 6,285,000 | B1 * | 9/2001 | Gawa et al. | 219/121.7 |
| 6,301,374 | B1 | 10/2001 | Stringa | |
| 6,310,316 | B1 * | 10/2001 | Arduino et al. | 219/121.67 |
| 6,325,585 | B1 | 12/2001 | Sasaki et al. | |
| 6,477,950 | B1 * | 11/2002 | Feilen et al. | 101/230 |
| 6,739,627 | B2 | 5/2004 | Cobben et al. | |
| 7,096,784 | B2 | 8/2006 | Giori et al. | |
| 2001/0054364 | A1 * | 12/2001 | Kusaka | 101/483 |
| 2002/0027359 | A1 | 3/2002 | Cobben et al. | |
| 2003/0222057 | A1 * | 12/2003 | Gerety | 219/121.7 |
| 2004/0026851 | A1 | 2/2004 | Schaede et al. | |
| 2005/0223922 | A1 | 10/2005 | Giori et al. | |
| 2005/0229804 | A1 | 10/2005 | Kumagai | |
| 2007/0151958 | A1 * | 7/2007 | Modra | 219/121.67 |

FOREIGN PATENT DOCUMENTS

| | | | | | |
|---|---|---|---|---|---|
| DE | 4442411 | A1 | | 6/1996 | |
| DE | 199 28 848 | A1 | | 12/2000 | |
| EP | 0 582 546 | A2 | | 2/1994 | |
| EP | 0 582 547 | A1 | | 2/1994 | |
| EP | 0 582 548 | A1 | | 2/1994 | |
| EP | 0 612 042 | A2 | | 8/1994 | |
| EP | 0 796 735 | | | 9/1994 | |
| EP | 0582548 | | * | 9/1994 | H04N 1/00 |
| EP | 0582548 | A1 | * | 9/1994 | H04N 1/00 |
| EP | 0 668 577 | | | 8/1995 | |
| EP | 0 734 863 | | | 10/1996 | |
| EP | 1 473 107 | A1 | | 11/2004 | |
| EP | 1579989 | A1 | | 9/2005 | |
| FR | 2 825 172 | A1 | * | 11/2002 | G06K 1/12 |
| JP | 2003-164988 | A | | 6/2003 | |
| WO | WO 97/18092 | A1 | | 5/1997 | |
| WO | WO 01/85457 | | | 11/2001 | |
| WO | WO 01/85586 | | | 11/2001 | |

* cited by examiner

PRINTING MACHINE WITH LASER PERFORATING

FIELD

The present invention relates to a printing machine equipped with a laser perforating unit for applying at least one perforation pattern onto printed sheets, in particular sheets for the production of securities, banknotes, passports, ID cards and other valuable documents.

The present invention also relates to a laser perforating system and a production process for applying at least one perforation pattern onto printed sheets.

BACKGROUND

Laser perforating of carriers representing value is known per se in the art. For example, U.S. Pat. No. 5,975,583, the content of which is incorporated by reference in the present application, discloses a carrier representing value and comprising perforation patterns provided by a laser beam which are at least partially recognisable with the eye and which have such a structure that they cannot or only with the greatest difficulties be applied on the carrier by other processes. Such carriers representing value are generally known, for instance in the form of giro cheques, bank cheques, eurocheques, banknotes, credit cards, shares, bonds and other documents representing a value. This prior art also relates to other types of documents representing a value such as passports, driving licenses and the like. As indicated in this prior art patent publication, it is a known problem that carriers representing value can be forged and falsified. This is becoming an increasingly more significant problem. A constant attempt is made here to keep one step ahead of the forgers. In recent times the use of colour copiers has made it increasingly easier to forge documents which were otherwise difficult to counterfeit.

The laser device described in U.S. Pat. No. 5,975,583 comprises at least one laser source which is disposed such that the laser beam exits upwards through an exit aperture. The laser beam is then reflected by means of a mirror and deflected at an angle of 90°, passes through a shutter and is subsequently deflected downwards by another mirror. The laser beam then passes through a focussing device whereby focussing of the laser beam takes place. The laser beam then passes to another mirror whereby the beam is deflected and fed to a deflecting device. In the deflecting device the laser beam is carried to the relevant location on the paper where it performs the perforating operation according to the disclosed process. The device further comprises a detector which responds to reference marks arranged on the paper for generating a synchronization signal for the purpose of synchronizing the control of the laser beam with the movement of the paper. This is particularly important when the transport speed of the paper is not constant. More specifically, arranged in the focussing device is a lens which focuses the laser beam coming from the laser source on the position where the laser beam contacts the paper. Means are herein provided for moving the lens upward or downward to always keep constant the optical distance between the lens and the contact position, and thus keep the laser beam focussed on the contact position. The deflecting device is formed by a first galvanometer which is connected to a mirror with which the location of the contact position can be moved in the direction of movement of the paper, and a second galvanometer which is connected to a mirror with which the location of the contact position can be moved transversely to the direction of movement of the paper. With the described device any random perforation pattern can be applied to the paper.

Another prior art is known from US patent application No 2002/0027359 A1, the content of which is incorporated by reference in the present application, which relates to a security feature comprising a perforation pattern. In this publication, a document to be protected against forgery comprises a security feature in the form of a perforation pattern, wherein the perforation pattern extends over a surface of the document and represents an image comprising brightness tones. The perforation pattern is herein formed such that, for instance when the thus treated document is held up to the light or placed on a light box, an image becomes visible at the location of the perforation pattern. The arrangement of such an image representing brightness tones requires extremely advanced technologies. Such technologies are not easily accessible to potential forgers, so that documents thus provided with such a perforation pattern are very difficult to forge. In this publication, the perforation pattern is preferably applied by means of laser light.

Another prior art publication is the PCT application No WO 97/18092, the content of which is incorporated by reference in the present application. This publication relates to security documents with a security marking. More specifically, the disclosed security marking for security documents, in particular papers representing a value, consists of a plurality of circular or elongate holes, which are arranged in parallel rows in a printed area of the document. The diameter of the holes is chosen such that they are practically invisible with bare eyes in reflection, but become well visible when the document is held against a light and viewed in transmission. The holes are generated by laser pulses. The marking can be produced quickly and easily and it can be verified without technical aids.

A disadvantage of the known machines is that they are so-called stand-alone machines with their own independent sheet feeder, sheet transport system and delivery system.

Another disadvantage of the prior art machines is that the proposed perforation principle cannot directly be applied to high speed sheet-processing or printing presses such as those used in the production of securities, in particular of banknotes. With such high-speed presses, the sheets are transported at high speed (at a speed of about 10,000 sheets per hour), thereby inducing waves and deformations on the surface of the sheets that make it impossible to apply the perforation patterns onto the sheets with sufficient preciseness. This problem is moreover pronounced by the fact that, in such high-speed presses, the sheets are transported by means of a chain gripper system comprising a plurality of space-apart gripper bars each provided with a row of grippers to hold only the leading edge of a sheet. Accordingly, except for the leading edge of the sheet, the greatest part of the sheet is not as such supported or held in place, thereby making it impossible to apply the perforation patterns with sufficient preciseness.

SUMMARY

It is an aim of the present invention to improve the known machines and processes. In particular, it is an aim of the present invention to make it possible to apply perforation patterns with sufficient preciseness while the sheet is transported by a sheet transport system of the type used in high-speed processing or printing presses.

It is another aim of the present invention to propose a machine which is preferably able to both print securities and perforate the printed securities.

It is a further aim of the present invention to provide a simple and efficient perforating system.

To this effect, the invention complies with the definition of the annexed claims.

BRIEF DESCRIPTION

The invention will best understood with reference to the accompanying drawings wherein.

Figure 5A:
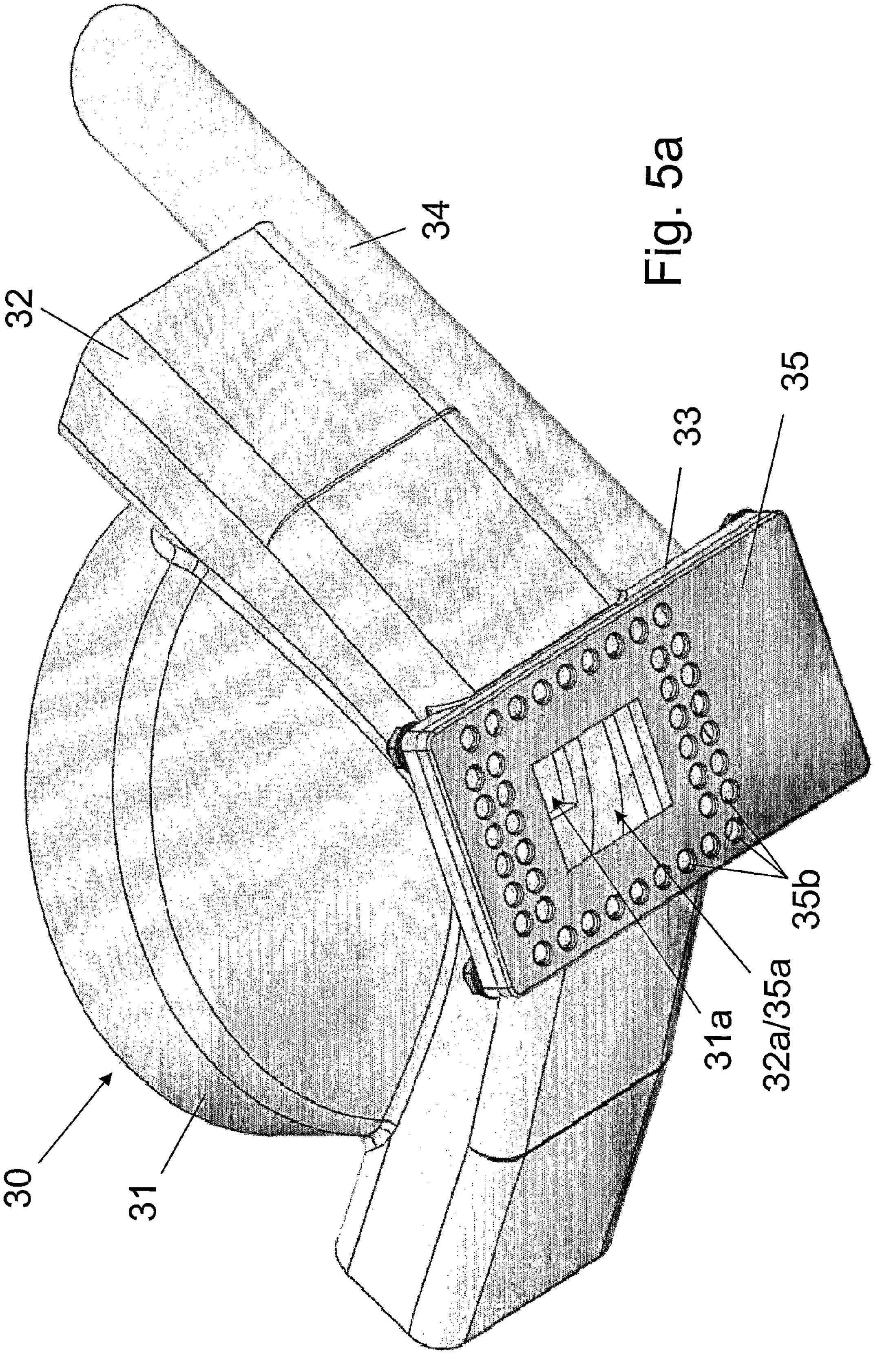
Figure 5B:
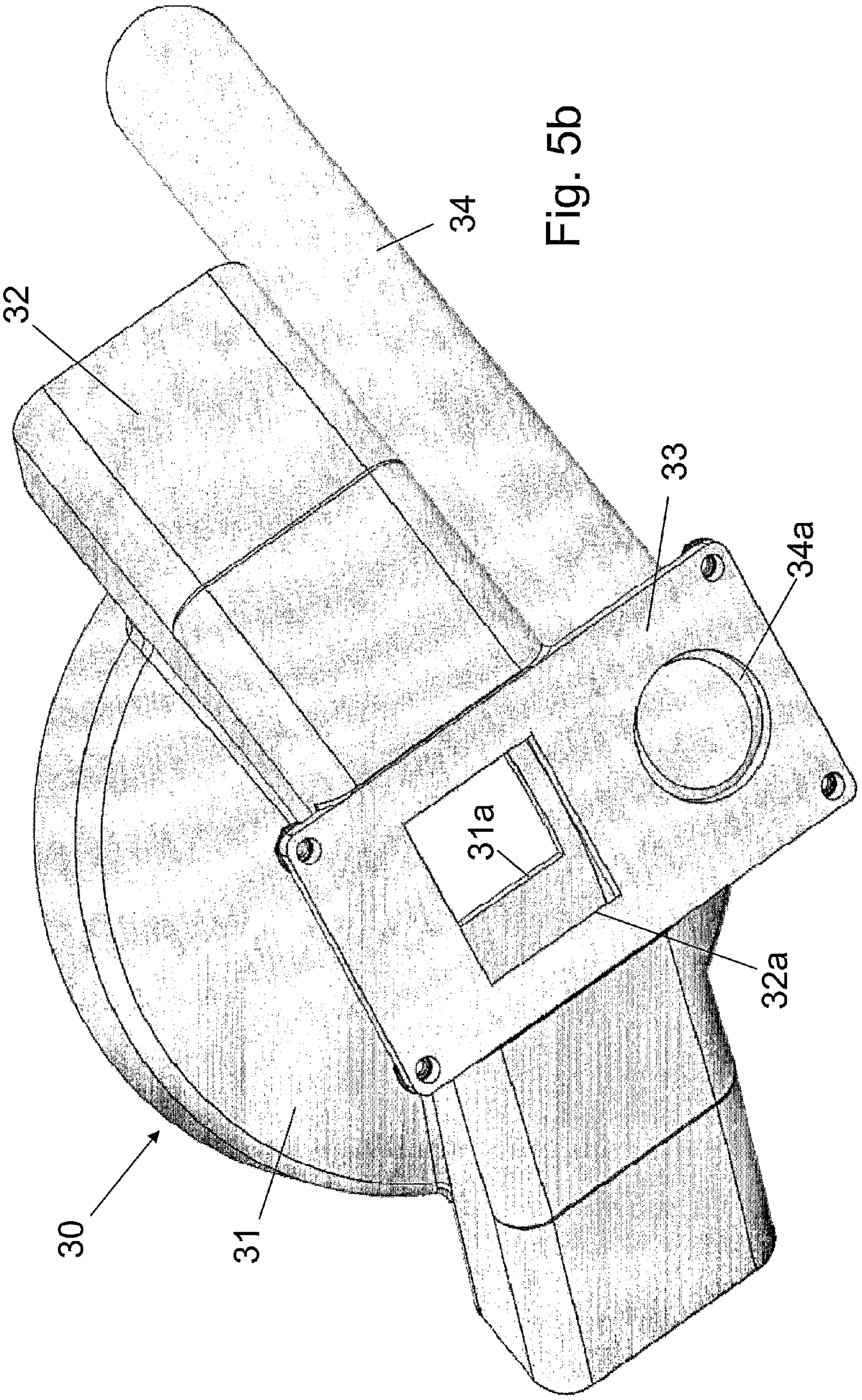

FIGS. 5*a* and 5*b* are perspective views of a suction part which is preferably located at the extremity of each laser head.

Figure 6:
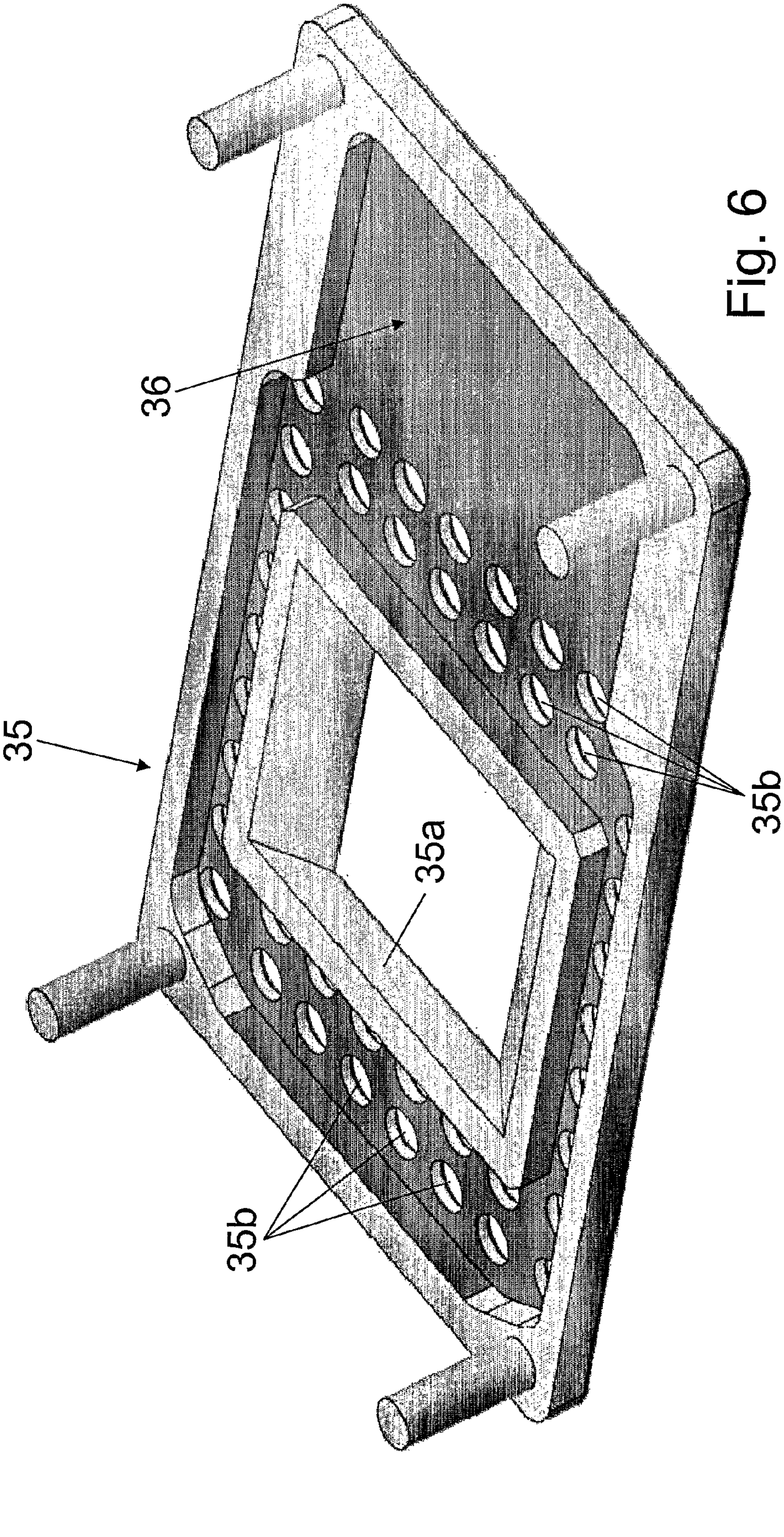

FIG. 6 is a perspective view of the suction plate which is disposed at the extremity of the suction part as shown in FIG. 5*a*.

Figure 7:
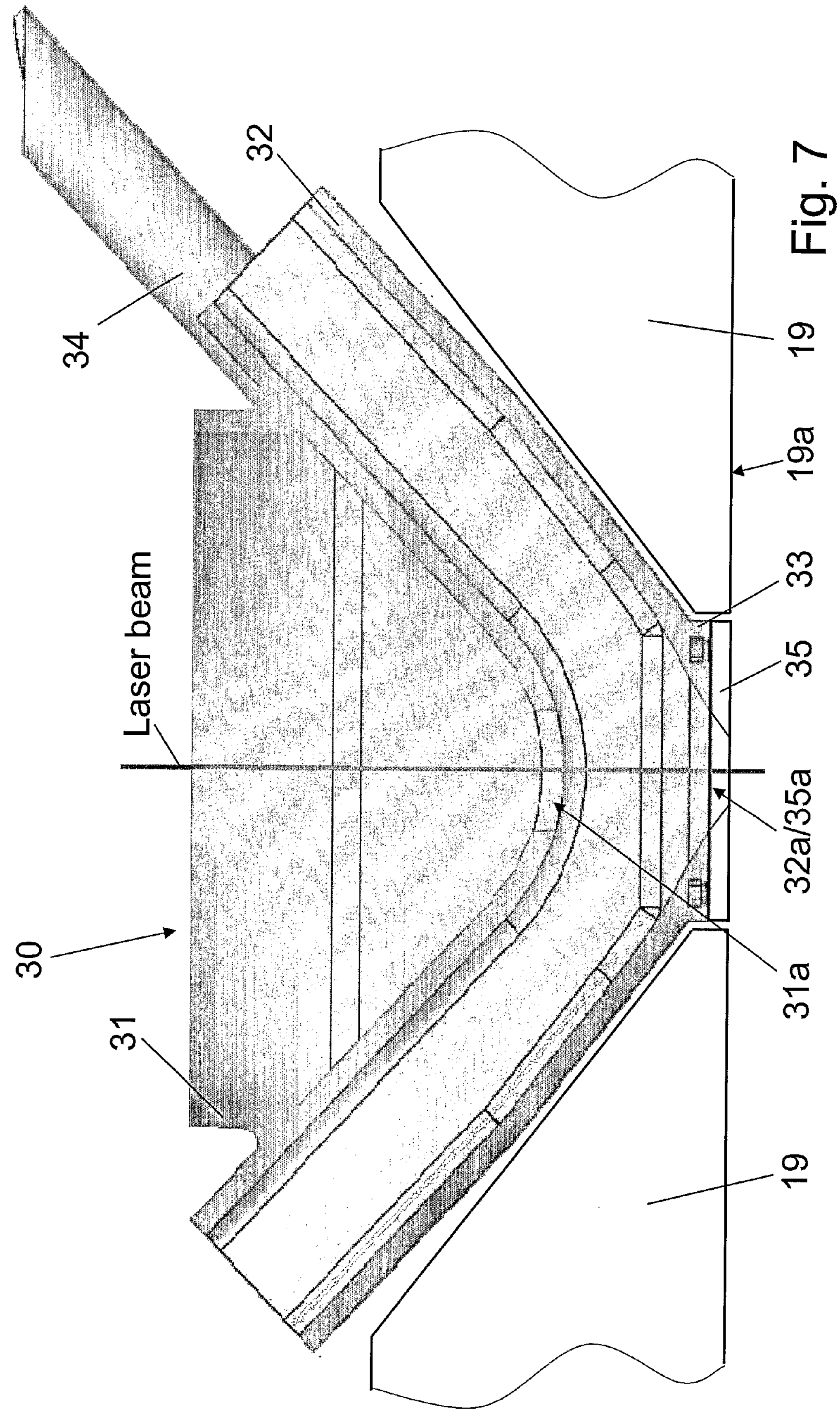

FIG. 7 is a cross-section of the suction part of FIG. 5*a* as mounted on the extremities of the laser heads of the laser perforating unit.

DETAILED DESCRIPTION

The invention will be described in the context of a particular embodying example, namely an intaglio printing machine equipped with a laser perforating system. It should however be understood that this example shall not be regarded as being limitative and that the disclosed laser perforating system could be applied to other type of printing or processing presses.

Figure 2:
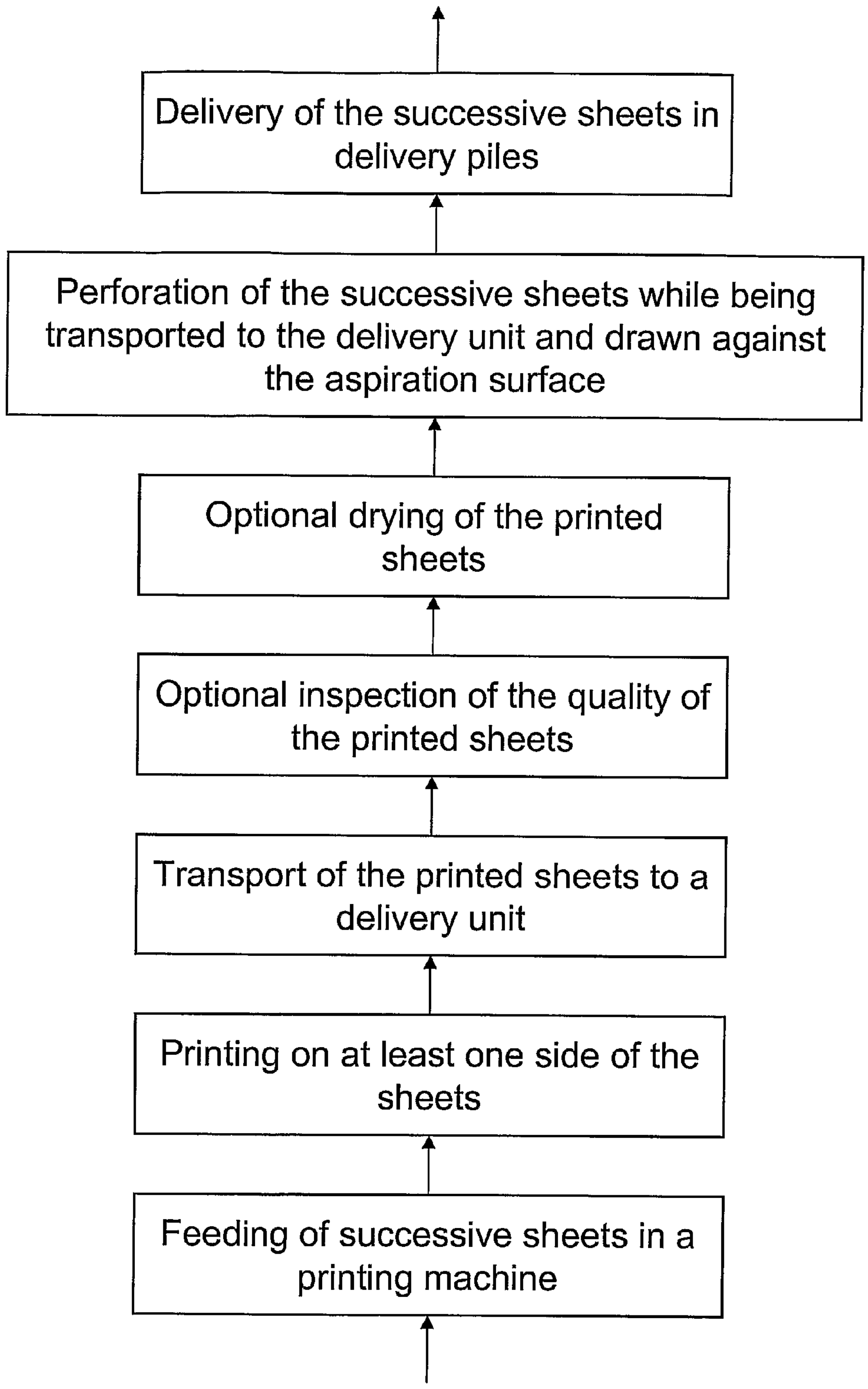
FIG. 2 shows a block diagram of a production process according to the present invention.
Figure 3:
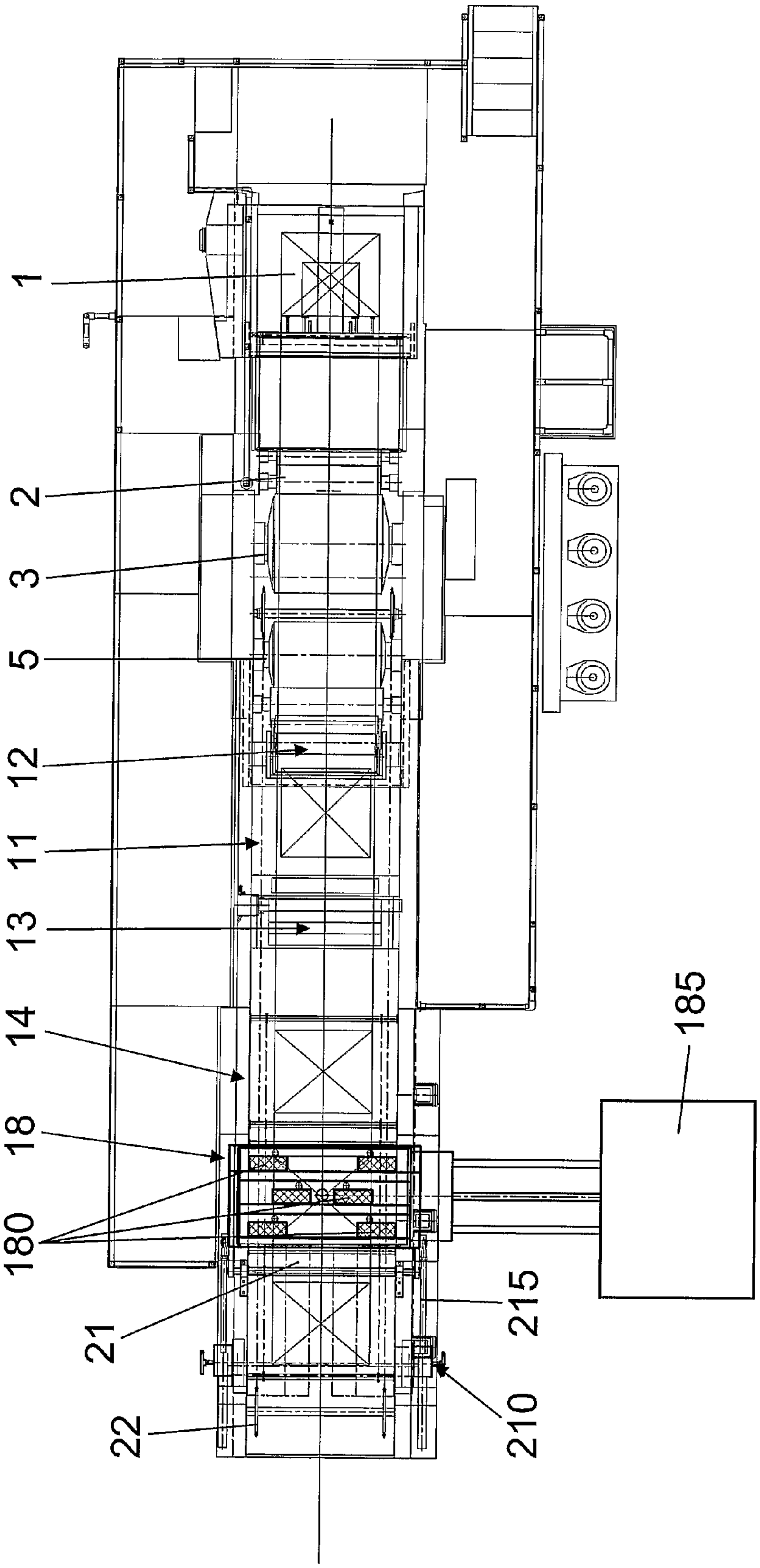
FIG. 3 is top view of the printing machine of FIG. 1.

In addition, within the scope of the present invention, "laser perforation/" should be understood as meaning that the sheets are subjected to a laser beam and wherein at least part of the material of the sheets is ablated by means of the laser beam to create a recess or perforation in the thickness of the sheets. In other words, the "perforation pattern" obtained as a result of the "laser perforation" could either be a pattern as shown in FIG. 2 of U.S. Pat. No. 5,975,583 where the perforation is made through the whole thickness of the sheet, a pattern as shown in FIG. 3 of U.S. Pat. No. 5,975,583 where only part of the material of the sheet is ablated, or a pattern that is a combination of these two patterns.

Figure 1:
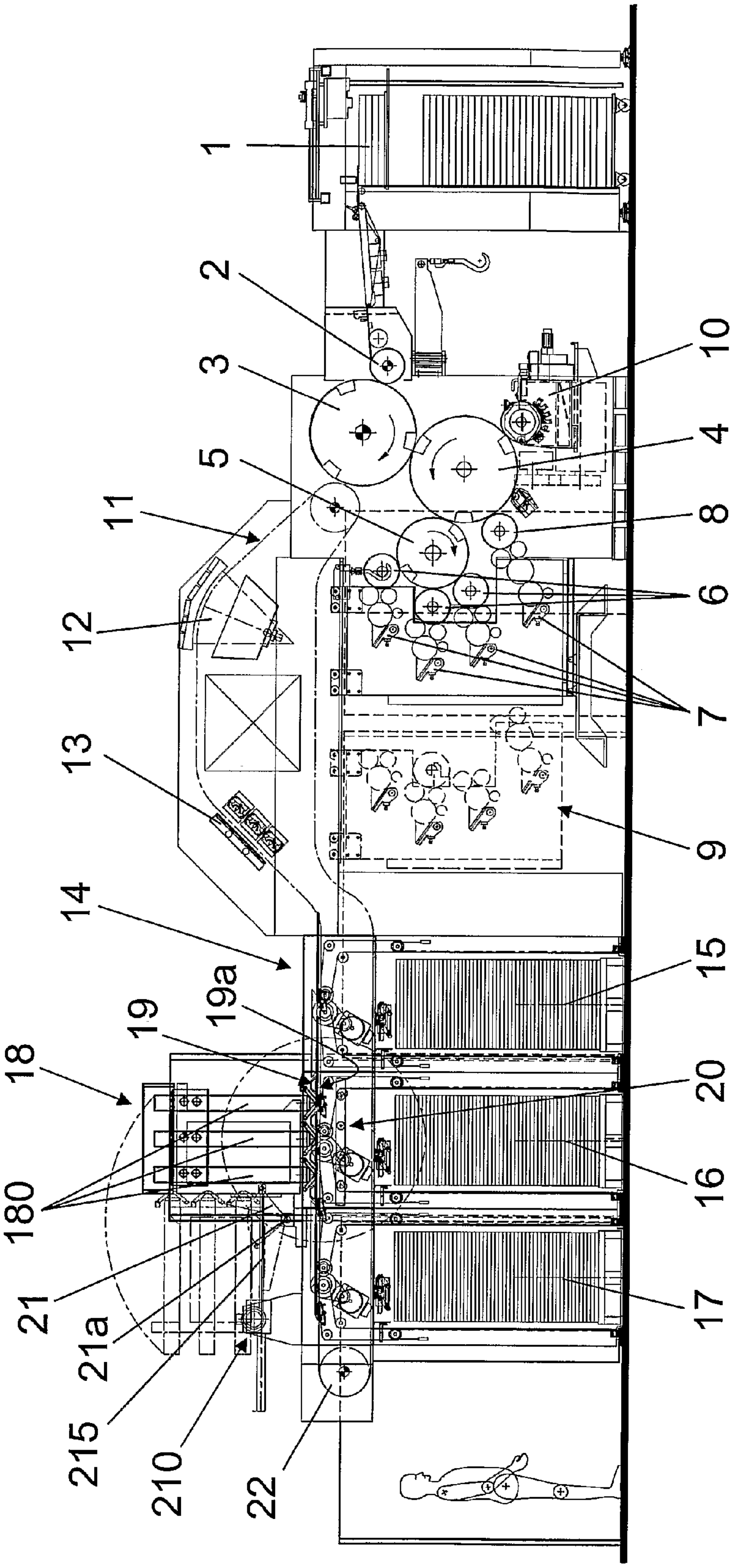
FIG. 1 is a side view of a printing machine with a laser perforating unit.

In FIG. 1, a printing machine equipped with a laser perforating system is illustrated, said machine being suitable to carry out the process represented in FIG. 2. The shown printing machine, as a non-limiting example, is an intaglio printing machine of the type known for instance from U.S. Pat. No. 5,062,359. To this effect this patent is incorporated by reference in the present application with regard to the disclosure of said intaglio printing machine. The machine comprises a sheet feeder 1 which feeds the successive sheets to a transfer roller 2. The sheets are then transferred from this roller 2 onto an impression cylinder 3 and held by grippers placed in pits of said cylinder 3, as is known in the art. This impression cylinder interacts with a plate cylinder 4 which carries engraved printing plates distributed uniformly around the cylinder, three printing plates being shown in the example shown in FIG. 1. There is in addition a collecting cylinder 5 in contact with the plate cylinder 4 for indirectly inking the plate cylinder 4. The collecting cylinder 5 has an elastic surface and is equipped with two blankets. Along the periphery of the collecting cylinder 5 and in contact with this cylinder are mounted selective inking cylinders 6 each being inked by its own inking device 7. Inks of various colours are transferred from the selective inking cylinders 6 onto the collecting cylinder 5 where they are collected and thereafter transferred onto the surface of the plate cylinder 4.

In this machine, there is also a direct inking unit for directly inking the plate cylinder 4. This direct inking unit comprises a selective inking cylinder 8 and associated inking device 7. In addition, located on the periphery of the plate cylinder 4, downstream of the direct color inking cylinder 8 with respect to the direction of rotation of the plate cylinder 4, there is a wiping unit 10 that cleans the surface of the engraved printing plates outside the intaglio cuts and which compresses the ink into the cuts of the printing plates prior to the printing operation.

As shown in FIG. 1, the inking devices 7 are placed in a movable carriage 9 which can moved away from the remainder of the printing unit as shown in dashed lines in FIG. 1.

The successive sheets which are held on the periphery of the impression cylinder 3 pass through a printing nip which is located between the impression cylinder 3 and the plate cylinder 4 and receive the intaglio print. Once the printing in done, the successive printed sheets are taken over by a transport system 11 comprising a chain gripper system and transported towards a delivery unit 14. In the configuration represented in FIG. 1, the successive sheets are transported in the transport system 11 with their printed side facing downwards (at least until the location where they are dropped onto delivery piles). Before arriving in the delivery unit per se, the printed successive sheets may optionally pass through an inspection unit 12 which controls the quality of the printing (for example as regards position, registration, color, quality of print and substrate, etc.) as is done in the following prior art references WO 01/85586, WO 01/85457, EP 0 796 735, EP 0 668 577, EP 0 734 863, EP 0 612 042, EP 0 582 548, EP 0 582 547 and EP 0 582 546, the content of which is incorporated by reference in the present application in connection with the process of quality inspection of printed securities.

Once inspected, the successive sheets may further be transported through a drying unit 13, for example a UV dryer, where the ink is dried.

The printed sheets are then transported to the delivery unit 14 of the machine, said delivery unit 14 comprising three delivery piles 15, 16 and 17 in the example of FIG. 1. For example one pile (e.g. pile 15) could be used for the defective sheets and the two other piles (e.g. 16 and 17) for acceptable sheets, each pile being fed alternatively.

Before being piled in the delivery piles 15, 16 or 17, the printed successive sheets pass in a laser perforating unit 18 comprising a plurality of laser heads 180 by means of which micro-perforations are carried out in the manner known from the above mentioned publications U.S. Pat. No. 5,975,583, US patent application No 2002/0027359 A1 and PCT application No WO 97/18092. For example, each laser head 180 may be similar to the laser head described in U.S. Pat. No. 5,975,583 which is incorporated by reference in the present application.

Accordingly, the successive sheets are carried by the chain gripper system 11 in front of the laser unit 18, with the non-printed side facing upwards. The laser perforating unit 18 is preferably disposed on top of the delivery unit 14 as illustrated in FIG. 1.

In order to ensure that the sheet to be perforated is positioned with sufficient preciseness in front of the laser perforating unit 18, an aspiration unit 19 with an aspiration surface 19*a* is further provided under the laser unit 18 to draw the sheet to be perforated against the aspiration surface 19*a* during the perforating process. In the example shown in FIG. 1, the aspiration unit 19 is positioned between the laser perforating unit 18 and the transporting path of the sheet transport system 11. Preferably, the aspiration surface 19*a* has holes for the vacuum (not illustrated) and openings (designated hereinafter by reference numeral 190) where the laser beams are applied to the sheet, and is parallel to the direction of transport of the sheets. The surface of the sheet applied against the aspiration surface 19*a* during perforation is preferably and advantageously the surface that has not been printed in this machine in order to avoid damaging the printed surface.

A second aspiration unit 20 is also preferably provided underneath the position of the sheet being perforated (i.e. on a side of the sheets opposite the laser perforating unit 18) in order to evacuate the fumes and the material being burnt during perforation.

In addition, for maintenance purposes, the laser unit 18 can be swung laterally through a swing arm 21 attached to the delivery unit 14 and which is pivotable about an axis 21*a* as shown in dashed lines in FIG. 1. Advantageously, swinging of laser unit 18 from and into the operating position can be performed by means of an actuating mechanism comprising a drive unit 210 acting on the laser unit 18 via an actuating arm 215.

Once the perforation operation has been carried out, each successive sheet is further transported by the chain gripper system 11, pass the roll 22 and is deposited in one of the delivery piles 15, 16 or 17 (the printed side of the sheets being directed upwards). Of course, if the sheet has a defect, the sheet is either not perforated, or only perforated where no defect is present, in the case of sheet carrying prints disposed in a matrix-like arrangement (as is usual in the field of securities).

A particular advantage of the machine shown in FIG. 1 is that the laser perforating unit 18 can be disposed along the transporting path of the sheet transporting system 11 at a location where transporting of the sheets can be decoupled from the printing unit. Indeed, driving of the sheet transport in the delivery unit 14 can be decoupled from and independent of the driving of the printing unit, thereby avoiding the influence of vibrations due to the printing operation, which is important when carrying out micro-perforations of this type which must be very precise. In addition, the fact that the drives for the printing unit and the delivery system can be independent allows an optimal regulation of the speeds and of the register when effecting the perforations.

Further, since the laser perforation unit is integrated in a printing machine, one avoids the use of separate feeders, delivery piles and transporting systems which all need maintenance. One also wins space and could add the perforating unit to the delivery unit of an existing printing machine, in a modular fashion.

FIG. 3 is a top view of the printing machine illustrated in FIG. 1 where one can see the arrangement of the laser heads 180 of the laser perforating unit 18. In this figure, one can see that the laser perforating unit 18 comprises a plurality of laser heads 180 (six in this example) distributed both transversely and longitudinally with respect to the direction of displacement of the sheets. The number of laser heads 180 basically depends on the number of perforation patterns to be performed on the sheets. In this particular example, the printing machine is designed to print sheets of securities such as banknotes, each sheet bearing a plurality of printed patterns arranged in a matrix form. More specifically, each sheet comprises an array of m columns and n rows of printed patterns. A column is defined in this case as being a series of printed patterns aligned along the direction of displacement of the sheets, while a row is defined as being a series of printed patterns aligned along a direction transverse to the direction of displacement of the sheets. The size of the array of printed patterns may vary and typically reaches a maximum size of six columns per ten rows (i.e. sixty printed patterns per sheet). Six laser heads 180 are thus provided in this particular example in order to be able to perform a perforation pattern in each of the up to six columns of printed patterns per sheet. It will be understood that each laser head 180 will be activated several times during the perforation of a sheet so as to provide each row of printed patterns with a perforation pattern. This arrangement is of course more economical than providing a laser perforating unit comprising as many laser heads as there are printed patterns on the sheets.

It this embodiment, the six laser heads 180 are distributed over a two-dimensional area (each laser head being assigned to a particular column of printed patterns on the sheets as mentioned hereinabove) rather than being aligned in a common row. It is to be understood, that such an arrangement may perfectly be envisaged provided the size of each laser head 180 allows for such a more compact arrangement.

Preferably, the position of each laser head 180, transversely to the direction of displacement of the sheets, may be adjusted individually for each laser head 180 so as to adapt the position of the laser head 180 to the number of printed patterns per sheet and to the location on each printed pattern where one wishes to apply the perforation pattern. This can be achieved by mounting each laser head 180 on a mounting rail (not shown) disposed transversely to the direction of displacement of the sheets. Further, adjustment of the position of each laser head 180 may be made manually or, advantageously, by means of a semi-automatic adjustment mechanism comprising electric motors or the like to move the respective laser heads 180 transversely along their mounting rails.

Furthermore, it shall be understood that it suffices to provide the laser perforating unit with as many laser heads as required to cover the maximum number of columns of printed patterns per sheet (typically six). Depending on the actual number of printed patterns per sheet, it is then only necessary to position and activate the required number of laser heads to cover the required number of columns of printed patterns. For example, should the size of the array of printed patterns be five columns per nine rows only, then one out of the six laser heads 180 can simply be deactivated while the five others are positioned at places corresponding to the five columns of printed patterns to perforate, each of the five remaining laser heads being activated nine times per sheet to cover all the rows of printed patterns.

Associated to the laser perforating unit 18, there will typically be a control unit (designated by reference numeral 185 in FIG. 3) to adjust the required operating parameters of the various laser heads 180, such as triggering times and durations, output power, etc.

Figure 4:
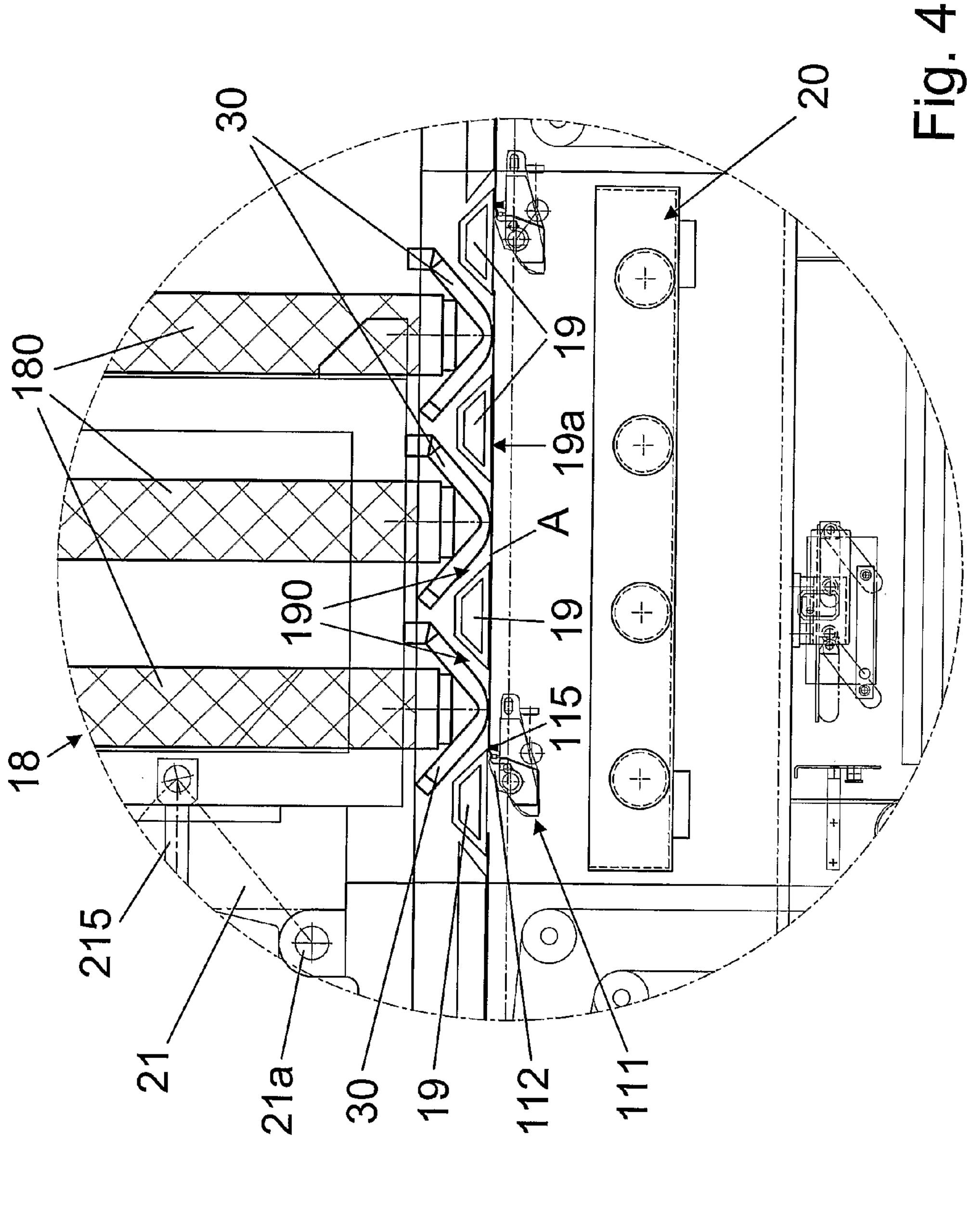
FIG. 4 is a partial view showing in greater details the laser heads of the laser perforating unit as well as the aspiration unit used to maintain the sheet being perforated.

FIG. 4 is an enlarged view of the area (identified by a dashed circle in FIG. 1) where the perforation process is performed and which shows in greater detail the ends of the laser heads 180 and the configurations of the first aspiration unit 19. As shown in FIG. 4, a sheet to be perforated (designated by reference A in FIG. 4) is held at its leading edge by a gripper bar 111 carrying a plurality of grippers 112 (the chain gripper system 11 comprising a plurality of spaced-apart gripper bars 111 as is known in the art) and transported in front of the perforation unit 18. As already mentioned hereinabove, the unprinted side of the sheet A is drawn by the first aspiration unit 19 against the aspiration surface 19*a*. During the perforation process, fumes and burnt materials are preferably aspirated at the lower side of the sheet A being perforated by the second aspiration unit 20. As this will be explained hereinafter, fumes and burnt materials which result from the perforation process could also be evacuated at the upper side of the sheet A being perforated.

As schematically illustrated in FIG. 4, the first aspiration unit 19 exhibits openings 190 at the locations of the laser heads 180. Seen transversely to the direction of displacement of the sheets along the transporting path, in this example, these openings 190 preferably exhibit a V-shape with the narrower part of the openings 190 oriented downwards, towards the sheets to perforate, in order to maximize the operative area of the suction surface 19*a*. The larger the suction surface 19*a*, the better the sheets will be held during the perforation process, thereby reducing mis-registration problems. Of course, the V-shape could also be oriented differently still retaining the narrower part of the openings 190 oriented downwards.

Preferably, in order to improve the application of the sheets against the suction surface 19*a*, especially at the leading edge of the sheets, each gripper bar 111 is further provided with a row of brushes 115 located shortly after the grippers 112 (upstream of the grippers 112 with regard to the direction of displacement of the sheets) in order to press the sheets against the suction surface 19*a*. Indeed, it should be understood that the location where the leading edge of the sheet A is gripped by the grippers 112 is slightly below the suction surface 19*a*, this spacing between the suction surface 19*a* and the grippers 112 being required to allow the grippers 112 to pass in front of the suction surface 19*a*. Accordingly, a certain distance is required for the sheet to be pulled from the location where it is gripped to the location where it is properly drawn against the suction surface 19*a*. Thanks to the brushes 115, pressure is applied against the sheet directly after the location where the leading edge of the sheet is gripped by the grippers 112, thereby reducing to a minimum the distance necessary for the sheet to be properly drawn against the suction surface 19*a*.

Preferably, in order to further improve the positioning of the sheet being aspirated against the suction surface 19*a* during the perforation process, each laser head 180 is further provided at its extremity with an additional suction part 30. This suction part 30 is schematically illustrated in FIG. 4 and shown in greater details in FIGS. 5*a*, 5*b* and 7. The function of this suction part 30 is twofold. Firstly, a purpose of this additional suction part is to further increase the effective area of the suction surface 19*a*. Another purpose of this additional suction part 30 is to evacuate the fumes and burnt materials on the upper side of the sheets, similarly to the second aspiration unit 20.

As shown in FIGS. 5*a*, 5*b* and 7, the suction part 30 comprises a body portion 31 which is coupled to the extremity of the corresponding laser head 180. This body portion 31 is open both at its upper and lower extremities and exhibits a generally conical shape. The lower extremity of the body portion 31 includes an aperture 31*a* through which is directed the laser beam (which laser beam is schematically illustrated in FIG. 7 by a thick line). The suction part 30 further includes a V-shaped evacuation conduit 32 which forms an integral part with the body portion 31. The aperture 31*a* of the body portion 31 opens into the evacuation conduit 32, the lower extremity of the evacuation conduit 32 being similarly provided with an aperture 32*a* through which the laser beam can pass. Air is sucked (or blown) into the evacuation conduit 32 in order to evacuate fumes and burnt materials that result from the perforation process.

In addition, the suction part 30 further includes an aspiration conduit 34 disposed next to the evacuation conduit 32 and which preferably forms an integral part with the body portion 31 and evacuation conduit 32. This aspiration conduit 34 similarly exhibits at its lower extremity an aperture 34*a* which is located next to the aperture 32*a* of the evacuation conduit (see FIG. 5*b*).

As shown in FIG. 5*b*, the lower portion of the suction part 30 is shaped as a rectangular planar portion 33, the plane of which is parallel to the suction surface 19*a*. Both the aperture 32*a* at the lower extremity of the V-shaped evacuation conduit 32 and the aperture 34*a* at the lower extremity of the aspiration conduit 34 open in this planar portion 33.

As illustrated in FIG. 5*a*, the planar portion 33 carries a suction plate 35 which has a corresponding rectangular planar shape (see also FIG. 6). As shown in FIG. 7, the lower surface of the suction plate 35 is flush with the suction surface 19*a* of the aspiration unit 19 to thereby create an almost uniform suction surface for the sheets. Referring to FIGS. 5*a* and 6, one can see that the suction plate 35 is also provided with an aperture 35*a* which is aligned with apertures 31*a* and 32*a* to allow the laser beam to pass. The suction plate 35 is further provided with a plurality of aspiration holes 35*b* surrounding the aperture 35*a*. As shown in FIG. 6, a recess 36 into which the aspiration holes 35*b* open is formed on the upper side of the suction plate 35 such that, when the suction plate 35 is mounted onto the planar portion 33, this recess 36 builds a channel around the aperture 35*a*, which channel is operatively connected through aperture 34*a* to the aspiration conduit 34. By applying vacuum in the aspiration conduit 34, air can be aspirated through the aspiration holes 35*b* thereby drawing the sheet to be perforated against the surface of the suction plate 35.

It will thus be understood that each additional suction part 30 with its integrated suction mechanism advantageously allows for an extension of the aspiration surface 19*a* of the aspiration unit 19 by filling the gaps 190 where the laser heads 180 are located. Both the aspiration unit 19 with its aspiration surface 19*a* and the suction plates 35 of the suction parts 30 contribute to form an almost even suction surface for the sheets, further preventing registration problems during the perforation process and ensuring that the sheets are located at a proper distance with respect to the laser heads.

Of course, the machine of the present invention is not limited to an intaglio printing machine as represented in FIG. 1 but other machines using other printing techniques can be envisaged, such as silk-screen printing, offset printing, etc.

The invention claimed is:

1. A laser perforating system for applying at least one perforation pattern onto printed sheets, in particular sheets for the production of securities, banknotes, passports, ID cards and other valuable documents, comprising a sheet transport system for transporting the printed sheets along a transporting path, a laser perforating unit with at least one laser head disposed along the transporting path of the sheet transport system for perforating said printed sheets, and a first aspiration unit to maintain the printed sheets against an aspiration surface of the first aspiration unit during perforation by said laser perforating unit, said aspiration surface being part of the first aspiration unit and non-movable in the direction of sheet transportation;

said first aspiration unit being disposed between said laser perforation unit and said transporting path of the sheet transport system and comprising at least one opening in said aspiration surface through which is directed said at least one laser head, wherein the first aspiration unit is distinct from and not a part of the sheet transport system, wherein the sheet transport system is able to transport the sheets in front of the sheet perforation system and relative to the aspiration surface of the first aspiration unit while the sheets are being perforated and wherein the sheet transport system is configured to take separate, successive sheets from a first pile;

wherein said sheet transport system is a chain gripper system comprising a plurality of gripper bars each carrying a plurality of grippers for holding a leading edge of the sheets, the plurality of grippers of the sheet transport system passing in front of the aspiration surface.

2. A laser perforating system as claimed in claim 1, wherein said opening exhibits a V-shape with a narrower part of the opening oriented towards the sheets to perforate.

3. A laser perforating system as claimed in claim 1, wherein said at least one laser head comprises a suction part located at an extremity of said laser head and disposed in said opening, said suction part comprising aspiration means for drawing the sheets to perforate against said suction part.

4. A laser perforating system as claimed in claim 3, wherein said aspiration means comprise a suction plate with a planar suction surface which is flush with the aspiration surface of the first aspiration unit.

5. A laser perforating system as claimed in claim 3, wherein said suction part is further provided with evacuation means for evacuating the fumes and burnt material resulting from perforation of the sheets.

6. A laser perforating system as claimed in claim 1, wherein said laser unit comprises a plurality of laser heads distributed transversely to a direction of displacement of the sheets along the transporting path of said sheet transport system in order to perform a plurality of perforation patterns at sheet locations which are distributed transversely to the direction of displacement of the sheets.

7. A laser perforating system as claimed in claim 1, wherein each laser head is activated several times during processing of a sheet in order to perform a plurality of successive perforation patterns distributed longitudinally onto said sheets.

8. A laser perforating system as claimed in claim 6, wherein a position of each laser head, transversely to the direction of displacement of the sheets, is adjustable.

9. A laser perforating system as claimed in claim 1, wherein said laser unit further comprises a second aspiration unit to evacuate the fumes and burnt material resulting from perforation of the sheets on a side of the sheets opposite the laser perforating unit.

10. A laser perforating system as claimed in claim 1, wherein the laser unit is pivotable laterally by a swing arm.

11. A laser perforating system as claimed in claim 10, further comprising an actuating mechanism with a drive unit for performing swinging of the laser unit.

12. A laser perforating system as claimed in claim 1, wherein each gripper bar of the chain gripper system further comprises brushes for pushing the sheet held by said grippers against the aspiration surface.

13. A production process for applying at least one perforation pattern onto printed sheets, in particular sheets for the production of securities, banknotes, passports, ID cards and other valuable documents, comprising the following steps:

a) transporting separate, successive sheets along a transporting path of a sheet transportation system in front of a laser perforating unit;

b) aspirating the sheets against an aspiration surface of an aspiration unit in front of the laser perforating unit, wherein the aspiration unit is distinct from and not a part of the sheet transportation system, said aspiration unit being disposed between said laser perforation unit and said transporting path of the sheet transportation system and comprising at least one opening in said aspiration surface through which is directed said at least one laser head, said aspiration surface being part of the aspiration unit and non-movable in the direction of sheet transportation;

c) while the sheets are being aspirated against said aspiration surface, and transported past the laser perforating unit and relative to the aspiration surface, perforating the sheets by means of the laser perforating unit;

wherein said sheet transportation system is a chain gripper system comprising a plurality of gripper bars each carrying a plurality of grippers for holding a leading edge of the sheets, the plurality of grippers of the sheet transportation system passing in front of the aspiration surface.

14. A production process as claimed in claim 13, wherein said aspiration surface is additionally formed by an aspiration surface provided on said laser perforating unit.

15. A production process as claimed in claim 13, applied in a printing machine comprising a printing unit for performing a printing operation on at least one side of the sheets, wherein the perforation process is performed downstream of the printing unit.

16. A production process as claimed in claim 15, wherein transporting of the sheets through the printing unit is independent of the transporting of the sheets in front of the laser perforating unit.

17. A production process as claimed in claim 15, comprising the step of inspecting the quality of the printed sheets before the perforation process.

18. A production process as claimed in claim 15, comprising the step of drying the printed sheets before the perforation process.

* * * * *